Patented Apr. 22, 1930

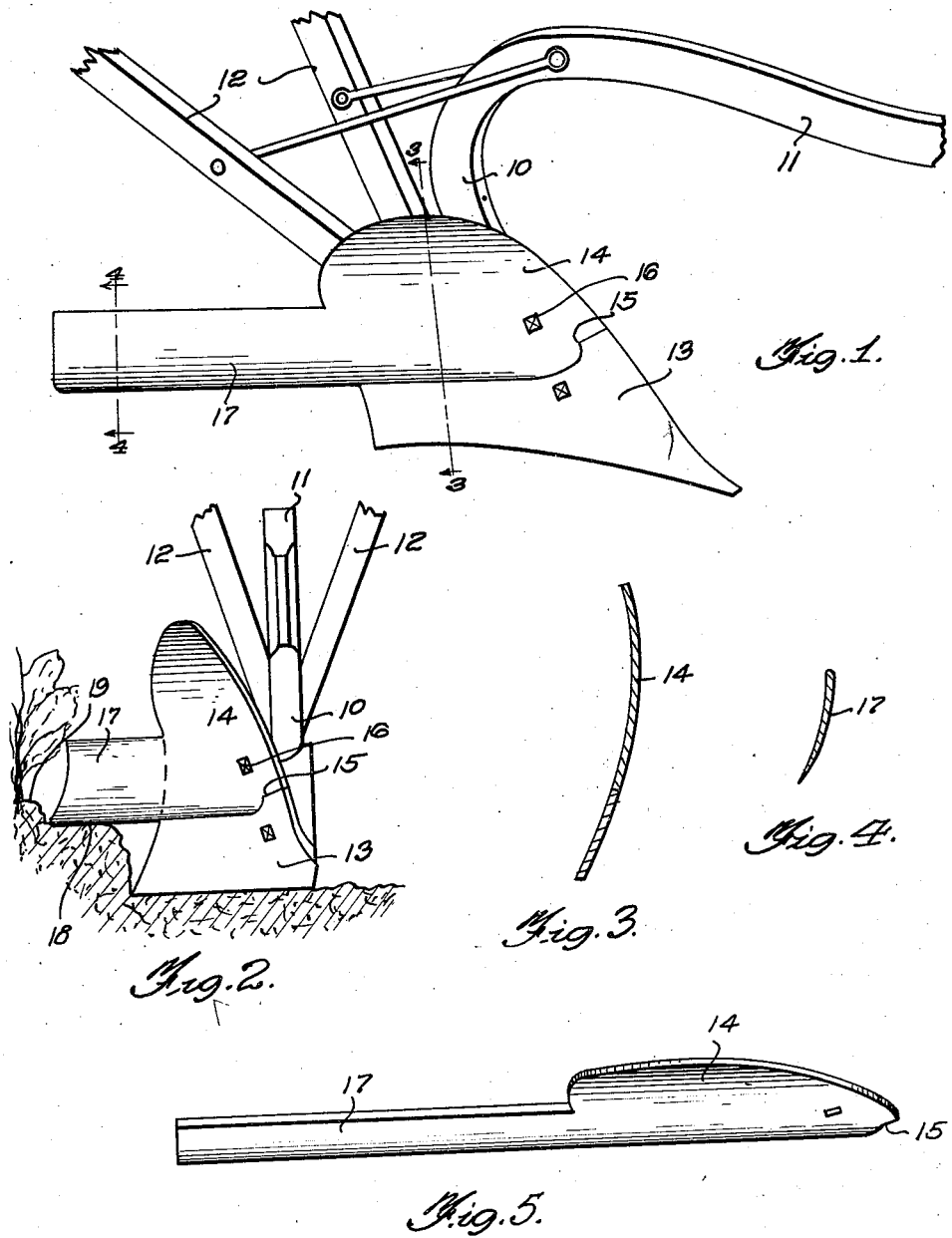

1,755,622

UNITED STATES PATENT OFFICE

BOB D. WHITLEY, OF NASHVILLE, NORTH CAROLINA

PLOW ATTACHMENT

Application filed December 18, 1928. Serial No. 326,763.

My invention relates to a wing attachment, for use in connection with a turning plow.

In accordance with my invention, I provide a wing attachment, which is mounted upon the plow stock of an ordinary turning plow, above and adjacent to the plowshare, and in place of the ordinary moldboard. This wing attachment extends rearwardly and laterally for a considerable distance beyond the plowshare. The plow with the attachment is particularly well adapted for plowing tobacco for the last time, the wing attachment serving to shave off the previously formed hill, and further hill up the plants, which serves to retain the moisture about the roots, without injuring the leaves of the plants. While the attachment is particularly well adapted for use in plowing tobacco, it is not necessarily restricted to this use.

In the accompanying drawings, forming a part of this specification, and in which like numerals are employed to designate like parts throughout the same, Figure 1 is a perspective view of a wing attachment embodying my invention, showing the same in use, Figure 2 is a front end elevation of the same, Figure 3 is a vertical section taken on line 3—3 of Figure 1, Figure 4 is a similar view taken on line 4—4 of Figure 1, and, Figure 5 is a plan view of the wing attachment.

In the drawings, wherein for the purpose of illustration, is shown a preferred embodiment of my invention, the numeral 10 designates a plow stock extended in the form of a plow beam 11. Arranged at the rear of the stock 10 are the handles 12. The numeral 13 designates a plowshare, which is bolted to the stock 10, in the usual manner.

The wing attachment embodies a forward portion 14, corresponding in shape to the usual moldboard, and having a point 15 for interfitting with the point of the plowshare 13. The usual moldboard is removed and the wing attachment is arranged in its place and is rigidly attached to the stock 10, by means of a bolt 16 or the like. The wing attachment embodies a relatively long horizontal extension 17, which projects rearwardly and laterally beyond the plowshare 13, for a considerable distance, as shown. This extension 17 is arranged at an elevation of about five inches above the point of the plowshare 13, and, therefore, engages the top of the hill 18, previously formed, shaving earth from the same, and throwing up an additional hill 19, about the roots of the plants, without injuring the leaves of the same. This hill 19 serves to retain the moisture about the roots of the plants. As shown in Figure 3, the forward portion of the wing attachment is curved in cross section, and the horizontal extension 17 is also curved in cross section, Figure 4, with its lower edge sharpened. This sharpened edge starts at a point at the rear of the plowshare 13 and continues to the rear end of the same.

It is to be understood that the form of my invention, herewith shown and described, is to be taken as a preferred example of the same, and that various changes in the shape, size and arrangement of parts, may be resorted to without departing from the spirit of my invention, or the scope of the subjoined claim.

Having thus described my invention, I claim—

A plow for cultivating hilled tobacco plants or the like, comprising a plowshare having an upper horizontal edge at a substantial elevation above its lower edge, a horizontal wing arranged above and in engagement with said upper edge, said wing having a relatively long and relatively narrow extension formed integral therewith, said extension being of substantially the same width throughout its entire length, said extension projecting rearwardly and laterally beyond the wing and having its lower edge substantially horizontal and sharpened, the arrangement of the wing being such that its lower sharpened edge is adapted to shear the top of a hill and throw earth about the plants, said wing being sufficiently narrow to pass beneath the leaves of the plants without injury to the same.

In testimony whereof I affix my signature.

BOB D. WHITLEY.